Nov. 14, 1944.  S. A. HOLBERT  2,362,486
AIR SPEED CONTROL AND SPIN DELAY ASSEMBLY FOR LINK TRAINERS
Filed Feb. 29, 1944  2 Sheets-Sheet 2
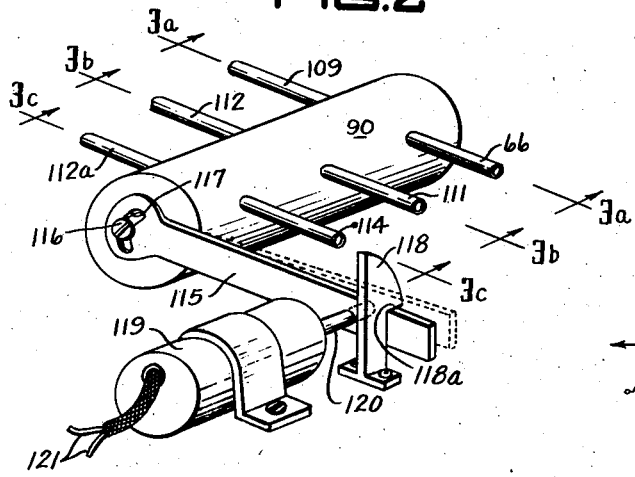
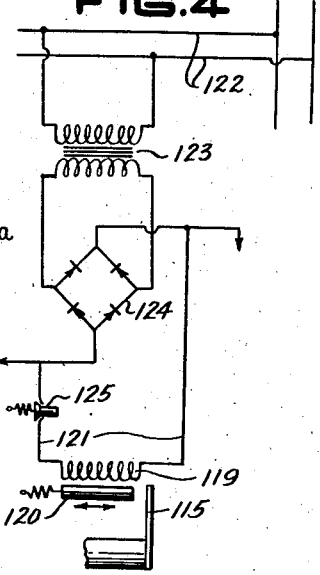
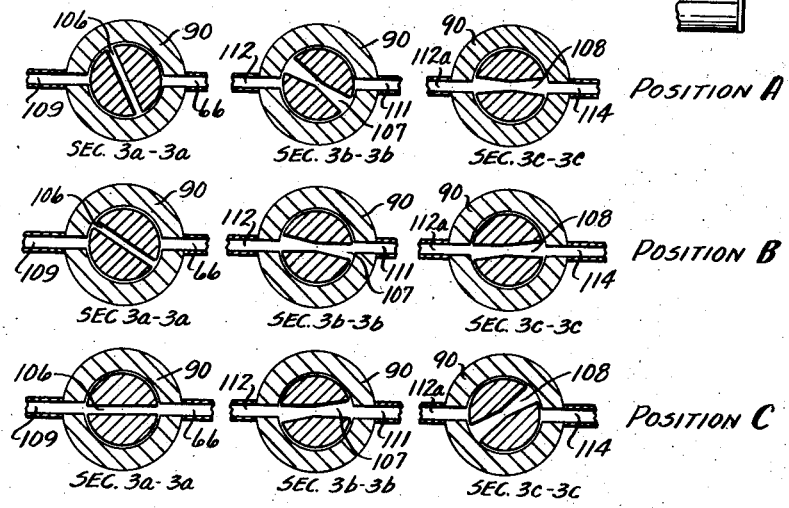
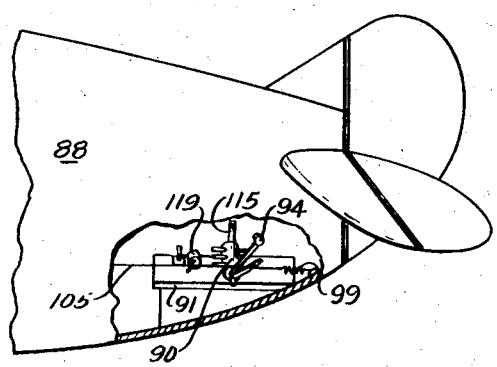
INVENTOR
SHERMAN A. HOLBERT
BY
ATTORNEYS Patented Nov. 14, 1944

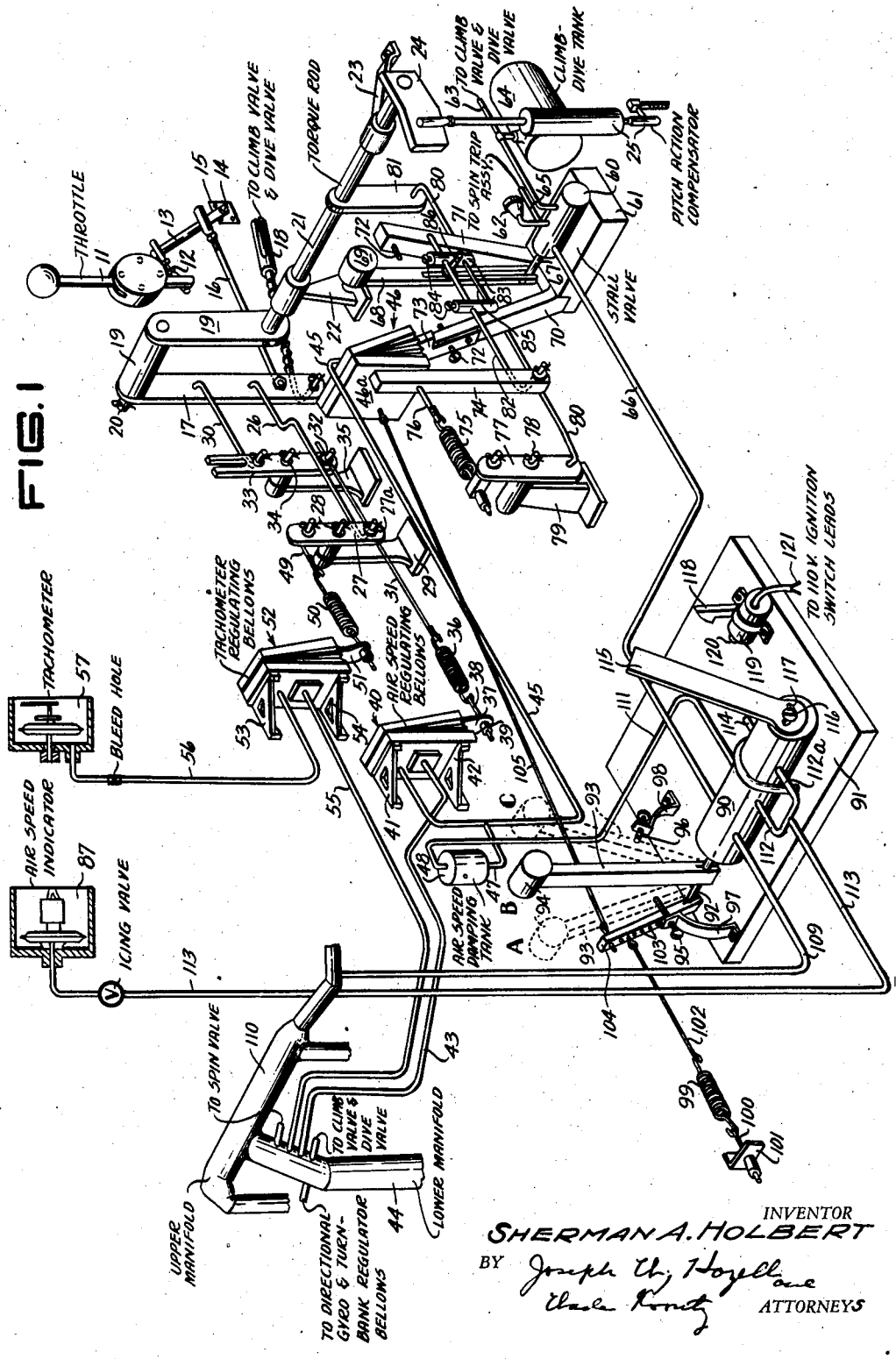

2,362,486

UNITED STATES PATENT OFFICE 2,362,486

AIR-SPEED CONTROL AND SPIN DELAY ASSEMBLY FOR LINK TRAINERS

Sherman A. Holbert, Manchester, Iowa

Application February 29, 1944, Serial No. 524,436

6 Claims. (Cl. 35—12)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in instrument flying trainers, especially the so-called Link trainers, manufactured by Link Aviation Devices, Inc. of Binghamton, New York, and employed by the Army Air Forces in the training of pilots. When a Link trainer is placed in operation and a student climbs into it, the stall valve is in the "spin" position, since application of vacuum to the stall valve bellows is necessary for normal operation; consequently, the trainer begins to spin immediately upon turning on the turbine which provides a source of vacuum for all the different vacuum-operated parts of the trainer. Heretofore it has been necessary for the instructor, prior to turning on the turbine, to remove a side panel from the trainer fuselage and reach in and take hold of the inverted pendulum which is a part of the stall valve assembly, so that the student could climb into the trainer and be seated and assume full control without being subjected to the spin. One object of the invention is to provide a mechanism which will automatically prevent the trainer from spinning when the turbine is first turned on, while permitting all parts of the trainer to function normally at all other times. Present Link trainers are also deficient in that the student may not practice instrument take-offs. All training in present Link trainers must start with the student in the trainer in normal flight attitude and starting from a predetermined altitude. Another object is to provide a mechanism which will permit accurate instrument indication for an instrument take-off, so that this procedure may be taught to and practiced by the student. Further objects are to provide a device for the stated purpose whose cost is reasonable, which requires little maintenance, and which may be installed without alteration of the trainer parts or impairment of their functions.

Reference may be made to Link Patent No. 2,099,857, dated November 23, 1937, for an understanding of the general nature of the Link trainer.

In the accompanying drawings showing the preferred form of the invention,

Fig. 1 is a schematic perspective view of part of the control apparatus of a Link trainer with the improvement installed;

Fig. 2 is a perspective view of the valve which is part of the improvement, shown in latched position, and indicating in dotted lines the unlatched position, the pendulum and more distant parts being omitted;

Fig. 3 is a series of sections on lines 3a—3a, 3b—3b and 3c—3c, Fig. 2, showing the positions of the three valve ports in positions A, B and C (Fig. 1) of the inverted pendulum;

Fig. 4 is a wiring diagram; and

Fig. 5 is a fragmentary elevation of the rear end of a Link trainer with the fuselage wall broken away to show the preferred location of the improvement.

Referring particularly to the drawings, and first to Fig. 1, the throttle lever 11 is pivoted intermediate its ends and has its lower end pivotally connected with a link 12, in turn pivotally connected with a lever 13 which is swingable about the axis of a pivot 14 at its lower end. Pivot 14 is carried by a plate 15 screwed to some fixed support (not shown). When the throttle lever is pushed forward, the simulated air speed of the trainer increases, and when it is pulled backward, the indicated air speed is lowered. Pivotally secured to lever 13 is a link 16 whose other end is pivotally connected to walking beam 17 between the upper and lower ends of the latter. The lower end of walking beam 17 has a spring-compensated rod 18 connecting it mechanically with the climb-dive valve assembly, not shown. A bell crank lever 19 is pivotally connected as at 20 to the upper end of the walking beam, and is rigidly secured at its lower end to one end of a torque rod 21, which is a horizontal rod extending laterally of the trainer and adapted to rock on its axis in journals supported by a pedestal 22 and angle bracket 23. At the other end of the torque rod an arm 24 is fixed, to which the upper end of the pitch action compensator assembly 25 is attached. The lower end of the pitch action compensator is secured to the iron cross of the revolving octagon (not shown) of the trainer.

Also pivotally connected to the walking beam 17 is a link 26 whose other end is pivotally connected as at 27a to a vertically mounted lever 27, swingable on pivot 28 supported on pedestal 29. A straight rod 31 is connected at one end, as at 32, to a vertically mounted lever 33 whose pivot 34 is supported on pedestal 35. A link 30 joins lever 33 with walking beam 17 at an intermediate point, so that the walking beam swings lever 33 as well as lever 27. It will be observed that these levers are swung in opposite directions. The other end of rod 31 is attached to a tension spring 36, whose opposite end is connected by an eye-bolt 38 and nut 39 to a bracket 37 projecting from the movable leaf of the air speed regulating bellows 40. The fixed leaf of said bellows is supported by two brackets 41, 42 on any fixed support, and a needle valve (not shown, but carried on the fixed leaf) controls the vacuum suction through vacuum line 43, which connects the interior of the bellows and the lower vacuum manifold 44. The turbine (not shown) is connected with this manifold. Another pipe or tube 45 connects the air speed regulating bellows 40 with the interior of bellows 46 of the stall valve to be described, and a branch tube 47 further connects the air speed regulating bellows with the air speed damping tank 48. At the upper end of lever 27 an eye-bolt 49 is secured, and a tension spring 50 is connected to the other end of said eye-bolt and also to a bracket 51 fixed to and projecting from the movable leaf of tachometer-regulating bellows 52. The tension of spring 50, also of spring 36, is adjustable by its eye-bolt. The fixed leaf of bellows 52 is secured to a pair of brackets 53, 54 by which bellows 52 is supported. A vacuum line 55, controlled by a needle valve (not shown) extends from the bellows 52 to lower vacuum manifold 44, and another vacuum line 56 extends from bellows 52 to tachometer 57.

When the speed of an airplane drops below a certain minimum, the airplane stalls and sometimes starts to spin. This characteristic is built into the Link trainer. Stall valve 60 is supported on a plate 61 secured to the floor of the fuselage of the trainer, and has a vent 62 open to the atmosphere, also a line 63 leading to the climb-dive tank 64, to the climb-dive valve assembly (not shown) and to the altimeter and vertical speed indicator, likewise not shown. Another tube 65 connects with the spin trip assembly (not shown) which starts the trainer spinning, in a manner well known to those who are familiar with Link trainers. It should be understood that the stall valve here illustrated is the old type, and that later models of trainers have a different stall valve construction and arrangement. Finally, a vacuum suction line 66 is connected to a source of vacuum (lower manifold 44) but with certain novel apparatus interposed in this line, as will be described. Now stall valve 60 is an oscillatory type of valve, that is, it is turned on its longitudinal axis to open and close various ports, unnecessary to illustrate, to control the suction through the lines 63, 65, 66 and through vent 62. Stall valve 60 has a stem 67 fixed to the valve body and projecting from one end, with an inverted pendulum fixed to the stem 67, said pendulum comprising a slotted bar 68 with a weight or bob 69 at its upper end. Plate 61 supports two diverging stationary arms 70, 71 arranged in a V, with stop screws 72 threaded through the upper ends of said arms to serve as adjustable stops for the pendulum bar 68. Since the stall valve is mounted on the floor of the trainer, any substantial tilting of said floor will cause the pendulum to fall to one side or the other until it strikes one of the stop screws 72. Simultaneously the stall valve will be oscillated to change the positions of its ports. Arm 70 has a bracket 73 fixed to its upper end, and stall valve bellows 46 is secured to this bracket, being however free to expand and collapse. The movable leaf 46a of bellows 46 has an arm 74 fixed thereto, so as to move when the bellows expands and collapses, and a tension spring 75 imposes a constant but adjustable pull on arm 74 through an eye-bolt 76.

The other end of spring 75 is anchored to the upper end of a lever 77 pivoted at 78 upon a pedestal 79. At its lower end, lever 77 is pivotally connected to a link rod 80 having a connection with the lower end of a vertical arm 81 fixed to torque rod 21. Spring 75 obviously tends to open stall valve bellows 46, and will open it if the source of vacuum is shut off from the interior of said bellows. It is also clear that counter-clockwise oscillation of torque rod 21 (by means of throttle 11) will cause lever 77 to swing counter-clockwise (as viewed in Fig. 1) increasing the tension on spring 75 and perhaps opening bellows 46, the result depending on the difference in the opposing forces. At normal "air speed" of the trainer, the vacuum suction is strong enough to keep bellows 46 collapsed, overcoming the tension of spring 75. Pivotally attached at one end to arm 74 is a straight rod 82 having adjustable stops 83 supported thereon and held in adjusted positions by set screws 84. A short rod 85 is received in stops 83 to form with rod 82 and said stops a four-sided enclosure for a pin 86 extending horizontally through the slot in slotted pendulum bar 68 and adjustable along said bar by means of a nut, as will be understood without further illustration. Rod 82 rests on pin 86, hence is supported more or less horizontally, although attached at one end only to arm 74. As pin 86 is contacted by stops 83 (which in turn are moved by arm 74 on the stall valve bellows), it will be pushed in one direction or the other, causing the pendulum to move to operate the stall valve. The described construction is a lost-motion connection between the stall valve bellows 46 and the pendulum which actuates the stall valve, but said pendulum is free to move, independently of stops 83, whenever the position of the trainer causes it to swing.

The parts so far described are well known to those acquainted with Link trainers, but are briefly mentioned so that the setting of the invention will be clearly understood.

Interposed between the stall valve and the source of vacuum, also the air speed indicator 87, is the device of my invention, which may be termed an air speed control and spin-delay assembly. Its preferred position in the trainer fuselage 88 is indicated in Fig. 5, but other locations are feasible.

The preferred embodiment of my invention employs a three-way valve 90 secured to a platform 91. Valve 90 is generally similar to stall valve 60, and has an axial stem 92 to which the arm 93 of an inverted pendulum is attached, the pendulum bob 94 being uppermost. The pendulum swings between two adjustable stops 95, 96 in the form of screws threaded through brackets 97, 98, respectively, attached to platform 91. The pendulum is biased to move to the left or counter-clockwise, as viewed in Fig. 1, by means of a tension spring 99 anchored by an eye-bolt 100 to an angle bracket 101 fixed to the fuselage. The other end of spring 99 is hooked to a link 102 adjustably secured to one of a series of perforations 103 in an arm 104 fixed to the outer extremity of valve stem 92. Obviously the tension of spring 99 may be adjusted by eye-bolt 100, and its moment arm on the valve may be increased or decreased by selection of different perforations 103. Arm 104 is also connected by a wire 105 to the movable leaf 46a of the stall valve bellows, and here again the moment arm is adjustable, as perforations 103 are also used for this connection.

The three-way valve 90 has three ports 106, 107, 108 (Fig. 3) in the valve body. Vacuum line 66 leads to one side of port 106, and another vacuum line 109 extends from the other side of said port to the upper manifold 110, which is open to the lower manifold 44. Thus when port 106 is open, as in the left bottom view of Fig. 3, the source of vacuum is connected to the stall valve. The middle port 107 is connected on one side by a tube 111 to the air speed damping tank 48, and on the other side is connected by a tube 112 to the tube 113 which extends to the air speed indicator 87. The third port 108 has an atmospheric vent 114 on one side, and a tube 112a coupled to the air speed indicator tube 113. The several positions of the ports 106, 107, 108 as the valve is moved with the inverted pendulum from position A, Fig. 1 to position B and then to position C, are clearly shown in Fig. 3 and require no further description.

To lock the valve when the pendulum is in position C, a latch lever 115 is employed, said latch lever being adjustably secured to the end of stem 92 by a screw 116 which is passed through an arcuate slot 117 in the end of the pivoted latch lever. The free end of the pivoted latch lever engages under a pivoted latch 118 carried upon platform 91 and, if preferred, latch 118 may be spring-actuated. Latch lever 115 is of spring metal, and may have the necessary resiliency to move past the cam end of the latch 118 and snap under the shoulder 118a (Fig. 2) when moved to the right or clockwise, as viewed in Fig. 1. If preferred, latch lever 115 may be moved under shoulder 118a by magnetism. To unlock (and if desired, to lock) the latch lever, a solenoid 119 is fixed on the platform and has a plunger 120 which is projected, when the solenoid is energized, to strike the latch lever and move it out from under catch 118a, whereupon the parts will act normally responsive to the pull of the spring and the opening or closing of the bellows 46a. Solenoid 119 is actuated by leads 121 which extend to a 110 v. ignition switch circuit. Referring to Fig. 4, the 110 v. main leads 122 are coupled to a step-down transformer 123, to the low side of which a copper oxide rectifier 124 is shown connected. A single-pole single-throw self-return switch 125 permits the student, or the instructor, to unlock valve 90 by momentarily closing the solenoid circuit. Latch lever 115 is then kicked out to the position illustrated in dotted lines, Fig. 2, and does not again return to the latched position because the valve pulls it away from the latch.

The operation is as follows: At the starting position the inverted pendulum 93, 94 is in position A, and valve port 106 is closed, which cuts off the stall valve 60 from the source of vacuum, and the spin trip assembly (not shown) which is operated through the stall valve, cannot trip to start the trainer spinning. This result (preventing the trainer from spinning) is accomplished even though the stall valve is in proper position to start the spinning, and independently of any action by the instructor or student. When port 106 is closed (Fig. 3) port 107 is also closed, which prevents any indication of air speed at indicator 87. Port 108 is then open, which opens the air speed line 113 to the atmosphere through vent 114. When the throttle 11 is advanced as for take-off, this swings walking beam 17 clockwise about its pivot 20, which swings lever 33 counterclockwise, pulling rod 31 to the right as viewed in Fig. 1 and increasing the tension on coil spring 36, thus opening the air speed regulating bellows 40. The needle valve (not shown, but described above) in bellows 40 is then moved so as to open tube 45 to the suction through line 43 from the lower suction manifold 44. The partial vacuum or suction in tube 45 exhausts air from the stall valve bellows 46, which collapses, moving bellows leaf 46a and causing arm 74 to move to the right, which moves the stall valve pendulum 68 to the right by action of the left hand stop 83 on pin 86. This movement of leaf 46a exerts a tension on wire 105, which pulls arm 104 to the right, causing pendulum 93 to rise from the dotted line position, position A toward the full line position. However, as atmospheric vent 114 is still open to the air speed line 113, the vacuum in said line is reduced. This retards the action of stall valve bellows 46, and pendulum 93 is slowly raised from position A to position B. Vacuum is then applied to line 113, and indicator 87 shows a slowly increasing air speed. Finally the stall valve bellows through wire 105 will move the pendulum to position C, whereupon the described automatic latching takes place, and latch lever 115 is held beneath the shoulder 118a of the latch. The trainer then reaches flying speed, according to indicator 87. If at any time flying speed is lost, port 106 will permit the vacuum to act through the stall valve to collapse the spin trip bellows (not shown), whereupon the trainer starts spinning, as is desired when the simulated aircraft loses air speed. Spinning of the trainer is effected through a rudder valve (not shown) and continues until power is cut off from the trainer or until the student manipulates the trainer controls in such a way as to regain normal flying speed (as shown on the indicator 87).

Satisfactory operation of the air speed control and spin delay assembly described above is evidently dependent upon the action of the inverted pendulum 93, 94. This pendulum supplements the action of the stall valve bellows 46 when that bellows is nearly collapsed, and hence exerting insufficient pull to operate valve 90. It also supplements the tendency of the spring 99 to return valve 90 to position. By adjusting the tension of spring 99, the take-off speed of the trainer may be controlled, since the application of vacuum to the air speed indicator 87 through line 113 depends on the position of the three-way valve 90.

Obviously the invention has all the advantages set forth above. However, it should be understood that the invention is not confined to the embodiment herein shown for the purpose of illustration, but may have various forms within the scope of the appended claims.

What I claim is:

1. In an instrument flying trainer of the type which employs a source of vacuum and a stall valve assembly for control of spinning of the trainer; said stall valve assembly having a bellows, a vacuum line leading to the bellows, a vacuum line leading to the stall valve body, and means connecting the bellows with the stall valve body to actuate the latter as the bellows expands or collapses; a valve interposed between the suction or vacuum side of the stall valve and the source of vacuum; a spring connected to the last named valve to cause it to assume a position wherein the vacuum source is cut off from the stall valve; means connecting the last named valve to the bellows of the stall valve to effect movement of the last named valve synchronously with collapse and expansion of the stall valve bellows; and operator-released latching means to lock the last named valve in the position wherein the source of vacuum is connected with the stall valve.

2. The invention according to claim 1, wherein the operator-released latching means comprises a latch lever fixed to the body of the last named valve, a latch engageable with said latch lever, a solenoid, a switch, a source of electricity, and a circuit connecting the switch, solenoid and source of electricity; the solenoid operating to release the latch lever from the latch when the switch is closed.

3. The invention according to claim 1, wherein the last named valve has a valve stem projecting therefrom; an inverted pendulum fixed to the valve stem; stops to regulate the amount of swing permitted the pendulum; an arm fixed to said valve stem; said spring being connected to the arm, and the means which connects the stall valve bellows with the last named valve also being connected with said arm, but in opposition to said spring.

4. The invention according to claim 1, wherein the trainer has an air speed indicator, an air speed damping tank, lines connecting the air speed damping tank with the source of vacuum and the stall valve bellows; the last named valve being a three-way valve, with connections on one side to the atmosphere, to the air speed damping tank and to the suction side of the stall valve, and with connections on the other side to the air speed indicator and to the source of vacuum.

5. In an instrument flying trainer of the type which employs a source of vacuum and a stall valve assembly for control of spinning of the trainer, valve means interposed between the stall valve assembly and the source of vacuum, vacuum lines connecting said valve means with the stall valve assembly and the source of vacuum, said valve means being constructed and arranged so that, when operation of the trainer is started, the source of vacuum is cut off from the stall valve assembly to obviate automatic spinning of the trainer; and operator-controlled means to permit said valve means to move into such position that the stall valve will resume its normal operating state.

6. In an instrument trainer having a source of vacuum, a stall valve, a vacuum line for connecting the stall valve to a spin trip assembly, said stall valve having a bellows which is collapsed by vacuum, and a tension spring connected to the bellows to tend to expand the same, the spring tension being overcome by the vacuum of normal operations; an air speed regulating bellows; a tension spring connected to the air speed regulating bellows so that its tension is overcome by the vacuum of normal operation; a vacuum line connecting the stall valve bellows with the air speed regulating bellows; a vacuum line connecting the air speed regulating bellows with the source of vacuum; an air speed damping tank; a vacuum line connecting the air speed damping tank with the air speed regulating bellows; a valve for controlling operation of said stall valve; a vacuum line directly connecting the last named valve with the stall valve; means mechanically connecting the last named valve with the stall valve bellows; a vacuum line connecting the air speed damping tank with the last named valve; an atmospheric vent connected to the last named valve; a tension spring connected to the last named valve to tend to move the same in one direction, the tension of said spring being also transmitted through the mechanical connecting means to the stall valve bellows; an inverted pendulum attached to the last named valve and co-operating with the last named spring when moving in one direction, and co-operating with the stall valve bellows when that bellows is nearly collapsed; an air-speed indicator; a tube connecting the air speed indicator with the last named valve; a vacuum line connecting the last named valve with the source of vacuum; means to latch the last named valve in the position in which the last named valve transmits vacuum suction to the stall valve; and operator-controlled means to release the latching means.

SHERMAN A. HOLBERT.